United States Patent
Lee et al.

(10) Patent No.: US 10,291,908 B2
(45) Date of Patent: May 14, 2019

(54) DEVICE FOR DETERMINING RESIDUAL IMAGE OF DISPLAY DEVICE AND METHOD FOR DETERMINING RESIDUAL IMAGE OF DISPLAY DEVICE

(71) Applicant: SAMSUNG DISPLAY CO., LTD., Yongin-si, Gyeonggi-Do (KR)

(72) Inventors: Hyunkoo Lee, Seoul (KR); Sooyoung Kim, Seoul (KR); Mintak Lee, Hwaseong-si (KR); Kyuseok Kim, Asan-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/950,419

(22) Filed: Apr. 11, 2018

(65) Prior Publication Data

US 2018/0295356 A1 Oct. 11, 2018

(30) Foreign Application Priority Data

Apr. 11, 2017 (KR) .......................... 10-2017-0046778

(51) Int. Cl.
*G01J 3/46* (2006.01)
*H04N 17/02* (2006.01)
*H04N 17/00* (2006.01)

(52) U.S. Cl.
CPC ........... *H04N 17/02* (2013.01); *H04N 17/004* (2013.01)

(58) Field of Classification Search
CPC ................................... G01J 3/46; H04N 17/02
See application file for complete search history.

(56) References Cited

U.S. PATENT DOCUMENTS

| 7,136,056 B2* | 11/2006 | Lee | G09G 3/006 345/207 |
| 7,619,637 B2* | 11/2009 | Higgins | G09G 5/02 345/589 |
| 2002/0118889 A1* | 8/2002 | Shimizu | G06T 5/008 382/274 |
| 2010/0228511 A1* | 9/2010 | Chin | G01J 3/46 702/82 |
| 2012/0013635 A1* | 1/2012 | Beeman | G09G 3/2003 345/590 |

FOREIGN PATENT DOCUMENTS

| KR | 2003-0089785 | 11/2003 |
| KR | 10-2008-0113989 | 12/2008 |
| KR | 10-2012-0106558 | 9/2012 |

* cited by examiner

*Primary Examiner* — Paulos M Natnael
(74) *Attorney, Agent, or Firm* — F. Chau & Associates, LLC (57) ABSTRACT

A method for determining residual images of a display device includes: dividing an image into a plurality of unit blocks; calculating a chroma, a hue, and a lightness of each unit block; applying a filter to the plurality of unit blocks to calculate a chroma difference, a hue difference, and a lightness difference; calculating a plurality of color difference based on the chroma, hue and lightness differences between the unit block and unit blocks adjacent to the unit block, a chroma weight constant, a hue weight constant, and a lightness weight constant; and calculating residual image indices for each unit block, where a residual image index is a maximum value of the plurality of color differences between the unit block and unit blocks adjacent to the unit block. The lightness weight constant is less than the chroma weight constant and the hue weight constant.

20 Claims, 8 Drawing Sheets

| Lightness difference (%) | Color difference | Color difference depending on K1 (ΔE00) | | | | | | | | | | |
|---|---|---|---|---|---|---|---|---|---|---|---|---|
| | | 1 | 0.5 | 0.3 | 0.2 | 0.15 | 0.12 | 0.11 | 0.1 | 0.09 | 0.06 | 0.05 |
| 1.26 | 0.0005 | 0.66 | 0.82 | 1.11 | 1.52 | 1.96 | 2.41 | 2.82 | 2.36 | 3.17 | 3.55 | 5.3 |
| 1.76 | 0.0007 | 1.02 | 1.22 | 1.61 | 2.17 | 2.78 | 3.40 | 3.69 | 4.03 | 4.46 | 4.99 | 7.90 |
| 1.16 | 0.0010 | 1.38 | 1.45 | 1.60 | 1.87 | 2.19 | 2.54 | 2.70 | 2.91 | 3.17 | 3.40 | 5.33 |
| 0.98 | 0.0013 | 1.78 | 1.82 | 1.91 | 2.08 | 2.29 | 2.51 | 2.66 | 2.81 | 3.01 | 3.29 | 4.72 |
| 1.33 | 0.0022 | 1.84 | 1.91 | 2.07 | 2.34 | 2.65 | 3.06 | 3.24 | 3.47 | 3.75 | 4.12 | 6.18 |
| 0.43 | 0.0039 | 3.34 | 3.35 | 3.35 | 3.37 | 3.40 | 3.43 | 3.45 | 3.47 | 3.50 | 3.54 | 3.84 |
| Standard deviation | | 0.9 | 0.9 | 0.8 | 0.6 | 0.32 | 0.46 | 0.46 | 0.46 | 0.54 | 0.64 | 1.38 |
| Coefficient of variation(CV) | | 0.55 | 0.50 | 0.39 | 0.28 | 0.20 | 0.16 | 0.150 | 0.149 | 0.153 | 0.17 | 0.25 |

FIG. 8

DEVICE FOR DETERMINING RESIDUAL IMAGE OF DISPLAY DEVICE AND METHOD FOR DETERMINING RESIDUAL IMAGE OF DISPLAY DEVICE

CROSS-REFERENCE TO RELATED APPLICATION

This application claims priority under 35 U.S.C. § 119 from, and the benefit of, Korean Patent Application No. 10-2017-0046778, filed on Apr. 11, 2017 in the Korean Intellectual Property Office (KIPO), the contents of which are herein incorporated by reference in their entirety.

TECHNICAL FIELD

Exemplary embodiments of the present disclosure are directed to a device for determining residual images of a display device and a method for determining residual images of a display device, and more particularly, to a device for determining residual images of a display device and a method for determining residual images of a display device reflecting human recognition characteristics in which residual images of the display device may be quantified and measured, and stored in a database to analyze and improve the residual images.

DISCUSSION OF RELATED ART

Organic light emitting diode ("OLED") display devices are self-light emitting display devices that display images using an OLED that emits light.

OLED display devices are currently attracting attention by virtue of characteristics such as low power consumption, light weight, small thickness and high reaction speed, unlike liquid crystal display ("LCD") devices because the OLED display devices do not require an additional light source.

However, an OLED may deteriorate and produce residual images. In particular, this phenomenon becomes severe at an area of the display where a same image, such as a logo, a time, a subtitle, and the like, is continuously displayed.

SUMMARY

Exemplary embodiments of the present disclosure can provide a device for determining residual images and a method for determining residual images of a display device in which residual images of the display device may be quantified and measured, and stored in a database to analyze and improve the residual images.

According to an exemplary embodiment, a method for determining residual images of a display device includes: capturing an image displayed by a display device; dividing the image into a plurality of unit blocks; measuring CIE XYZ chromatic coordinates for each unit block; transforming the CIE XYZ chromatic coordinates of each unit block into CIE Lab chromatic coordinates; calculating a chroma, a hue, and a lightness of each unit block from the CIE Lab chromatic coordinates of each unit block; applying a filter to the plurality of unit blocks to calculate a chroma difference, a hue difference, and a lightness difference, where the filter includes a filter center unit block and a plurality of filter adjacent unit blocks adjacent to the filter center unit block; calculating a plurality of color differences based on the chroma difference, the hue difference, and the lightness difference between the unit block and unit blocks adjacent to the unit block, a chroma weight constant, a hue weight constant, and a lightness weight constant; calculating residual image indices for each unit block, wherein a residual image index is a maximum value of the plurality of color differences between the unit block and unit blocks adjacent to the unit block; and storing the residual image indices in a database. The lightness weight constant is less than the chroma weight constant and the hue weight constant.

The lightness weight constant may have a value of about 0.08 or more and about 0.15 or less, and each of the hue weight constant and the chroma weight constant has a value of about 1.

Transforming the CIE XYZ chromatic coordinates of each unit block into the CIE Lab chromatic coordinates may be performed based on the following equation:

$$L^* = 116 f(Y/Y_n) - 16$$

$$a^* = 500[f(X/X_n) - f(Y/Y_n)]$$

$$b^* = 200[f(Y/Y_n) - f(Z/Z_n)]$$

$$f(I) = \begin{cases} I^{1/3} & \text{for } I > 0.008856 \\ 7.787 \times I + 4/29 & \text{otherwise} \end{cases},$$

wherein $L^*$, $a^*$, and $b^*$ denote the CIE Lab chromatic coordinates of the unit block, X, Y, and Z denote the CIE XYZ chromatic coordinates of the unit block, and each of $X_n$, $Y_n$, and $Z_n$ denotes a value obtained by normalizing the CIE XYZ chromatic coordinates with respect to a standard white.

Calculating the chroma, the hue, and the lightness of each unit block from the CIE Lab chromatic coordinates of each unit block may include calculating the chroma, the hue, and the lightness of each unit block based on the following equation:

$$L' = L^*$$

$$a' = (1+G)a^*$$

$$b' = b^*$$

$$C' = \sqrt{a'^2 + b'^2}$$

$$h' = \tan^{-1}(b'/a'),$$

wherein $L^*$, $a^*$, and $b^*$ denote the CIE Lab chromatic coordinates of the unit block, L' denotes a lightness, C' denotes a chroma, h' denotes a hue, and each of a', b', and G denotes a transform variable.

Applying the filter to the image to calculate a chroma difference, a hue difference and a lightness difference may include calculating the chroma difference, the hue difference and the lightness difference based on the following equation:

$$\Delta h' = h'_b - h'_c$$

$$\Delta L' = L'_b - L'_c$$

$$\Delta C' = C'_b - C'_b$$

$$\Delta H = 2\sqrt{C'_b C'_e} \sin\left(\frac{\Delta h'}{2}\right),$$

wherein $\Delta C'$ denotes the chroma difference, $\Delta H'$ denotes the hue difference, $\Delta L'$ denotes the lightness difference, $L_b'$ denotes a lightness of a unit block adjacent to the filter center unit block, $L_e'$ denotes a lightness of the filter center unit block, $C_b'$ denotes a chroma of the unit block adjacent to the filter center unit block, and $C_c'$ denotes a lightness of the filter center unit block.

Calculating the plurality of color differences may include: calculating the plurality of color differences based on the following equation:

$$\Delta E_{00} = \sqrt{\left(\frac{\Delta L'}{K_L S_L}\right)^2 + \left(\frac{\Delta C'}{K_C S_C}\right)^2 + \left(\frac{\Delta H'}{K_H S_H}\right)^2 + R_T \left(\frac{\Delta C'}{K_C S_C}\right)\left(\frac{\Delta H'}{K_H S_H}\right)},$$

wherein $\Delta L'$ denotes the lightness difference between the unit block and unit blocks adjacent to the unit block, $\Delta C'$ denotes the chroma difference between the unit block and unit blocks adjacent to the unit block, $\Delta H'$ denotes the hue difference between the unit block and unit blocks adjacent to the unit block, $S_L$ denotes a lightness compensation constant, $S_C$ denotes a chroma compensation constant, $S_H$ denotes a hue compensation constant, $K_L$ denotes the lightness weight constant, $K_C$ denotes the chroma weight constant, $K_H$ denotes the hue weight constant, and Rt denotes a chroma rotation variable.

The filter may be a homogeneity operator filter.

The filter may be a difference operator filter.

Storing the residual image indices in a database may include: calculating a value of an upper 10% of the residual image indices or calculating an average of the residual image indices; and storing the upper 10% of the residual image indices or the average of the residual indices in the database.

Applying the filter may include: moving the filter in a horizontal direction or a vertical direction wherein the filter center unit block is applied to all unit blocks of the image in a horizontal direction or a vertical direction; and calculating an absolute value of a chroma difference, a hue difference, and a lightness difference between a unit block corresponding to the filter center unit block and a unit block corresponding to the filter adjacent unit block.

The lightness weight constant may have a value of about 0.1, and each of the hue weight constant and the chroma weight constant may have a value of about 1.

According to an exemplary embodiment, a device for determining residual images of a display device includes: an imaging portion that captures an image displayed by a display device; an image dividing portion that divides the image into a plurality of unit blocks; a chromatic coordinate measuring portion that measures CIE XYZ chromatic coordinates for each unit block; a chromatic coordinate transforming portion that transforms the CIE XYZ chromatic coordinates into CIE Lab chromatic coordinates and transforms the CIE Lab chromatic coordinates into a chroma, a hue, and a lightness; a filter portion that calculates a chroma difference, a hue difference, and a lightness difference using the filter, where the filter portion includes a filter center unit block and filter adjacent unit blocks adjacent to the filter center unit block; a color difference calculating portion that calculates a plurality of color differences based on the chroma difference, the hue difference, and the lightness difference between the unit block and unit blocks adjacent to the unit block, using a chroma weight constant, a hue weight constant, and a lightness weight constant; a residual index calculating portion that calculates residual image indices for each unit block, where a residual image index is a maximum value of the plurality of color differences between the unit block and unit blocks adjacent to the unit block; and a database that stores the residual image indices. The lightness weight constant has a value less than a value of the chroma weight constant and a value of the hue weight constant.

The lightness weight constant may have a value of about 0.08 or more and about 0.15 or less, and each of the hue weight constant and the chroma weight constant may have a value of about 1.

The color difference calculating portion may calculate the color difference based on the following equation:

$$\Delta E_{00} = \sqrt{\left(\frac{\Delta L'}{K_L S_L}\right)^2 + \left(\frac{\Delta C'}{K_C S_C}\right)^2 + \left(\frac{\Delta H'}{K_H S_H}\right)^2 + R_T \left(\frac{\Delta C'}{K_C S_C}\right)\left(\frac{\Delta H'}{K_H S_H}\right)},$$

wherein $\Delta L'$ denotes a lightness difference between the unit block and unit blocks adjacent to the unit block, $\Delta C'$ denotes a chroma difference between the unit block and unit blocks adjacent to the unit block, $\Delta H'$ denotes a hue difference between the unit block and unit blocks adjacent to the unit block, $S_L$ denotes a lightness compensation constant, $S_C$ denotes a chroma compensation constant, $S_H$ denotes a hue compensation constant, $K_L$ denotes the lightness weight constant, $K_C$ denotes the chroma weight constant, $K_H$ denotes the hue weight constant, and Rt denotes a chroma rotation variable.

The filter may be a homogeneity operator filter.

The lightness weight constant may have a value of about 0.1, and each of the hue weight constant and the chroma weight constant may have a value of about 1.

According to an exemplary embodiment, a method for determining residual images of a display device includes: dividing a digital image into a plurality of unit blocks; applying a filter to the plurality of unit blocks to calculate a chroma difference between a unit block and unit blocks adjacent to the unit block, a hue difference between a unit block and unit blocks adjacent to the unit block, and a lightness difference between a unit block and unit blocks adjacent to the unit block, wherein the filter includes a filter center unit block and a plurality of filter adjacent unit blocks adjacent to the filter center unit block; calculating a plurality of color differences based on the following equation:

$$\Delta E_{00} = \sqrt{\left(\frac{\Delta L'}{K_L S_L}\right)^2 + \left(\frac{\Delta C'}{K_C S_C}\right)^2 + \left(\frac{\Delta H'}{K_H S_H}\right)^2 + R_T \left(\frac{\Delta C'}{K_C S_C}\right)\left(\frac{\Delta H'}{K_H S_H}\right)},$$

wherein $\Delta L'$ denotes the lightness difference, $\Delta C'$ denotes the chroma difference, $\Delta H'$ denotes the hue difference, $S_L$ denotes a lightness compensation constant, $S_C$ denotes a chroma compensation constant, $S_H$ denotes a hue compensation constant, $K_L$ denotes the lightness weight constant, $K_C$ denotes the chroma weight constant, $K_H$ denotes the hue weight constant, and Rt denotes a chroma rotation variable; and calculating residual image indices for each unit block, wherein a residual image index is a maximum value of the plurality of color differences between the unit block and unit blocks adjacent to the unit block. The lightness weight constant is less than the chroma weight constant and the hue weight constant.

The digital image may be captured from a display of a display device. The method may further include: measuring CIE XYZ chromatic coordinates for each unit block; transforming the CIE XYZ chromatic coordinates of each unit block into CIE Lab chromatic coordinates; calculating a chroma, a hue, and a lightness of each unit block from the CIE Lab chromatic coordinates of each unit block; and storing the residual image indices into a database.

The filter may be a homogeneity operator filter.

The lightness weight constant may have a value of about 0.1, and each of the hue weight constant and the chroma weight constant may have a value of about 1.

The foregoing is illustrative only and is not intended to be in any way limiting. In addition to the illustrative aspects, exemplary embodiments and features described above, further exemplary embodiments and features will become apparent by reference to the drawings and the following detailed description.

DETAILED DESCRIPTION

Exemplary embodiments will now be described more fully hereinafter with reference to the accompanying drawings. Although the disclosure may be modified in various manners and have several exemplary embodiments, exemplary embodiments are illustrated in the accompanying drawings and will be mainly described in the specification. However, the scope of the disclosure is not limited to the exemplary embodiments and should be construed as including all the changes, equivalents and substitutions included in the spirit and scope of the disclosure.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Throughout the specification, when an element is referred to as being "connected" to another element, the element is "directly connected" to the other element, or "electrically connected" to the other element with one or more intervening elements interposed therebetween.

The word "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Like reference numerals may refer to like elements throughout the specification.

Hereinafter, an exemplary embodiment will be described with reference to FIGS. 1 to 8.

Figure 1:
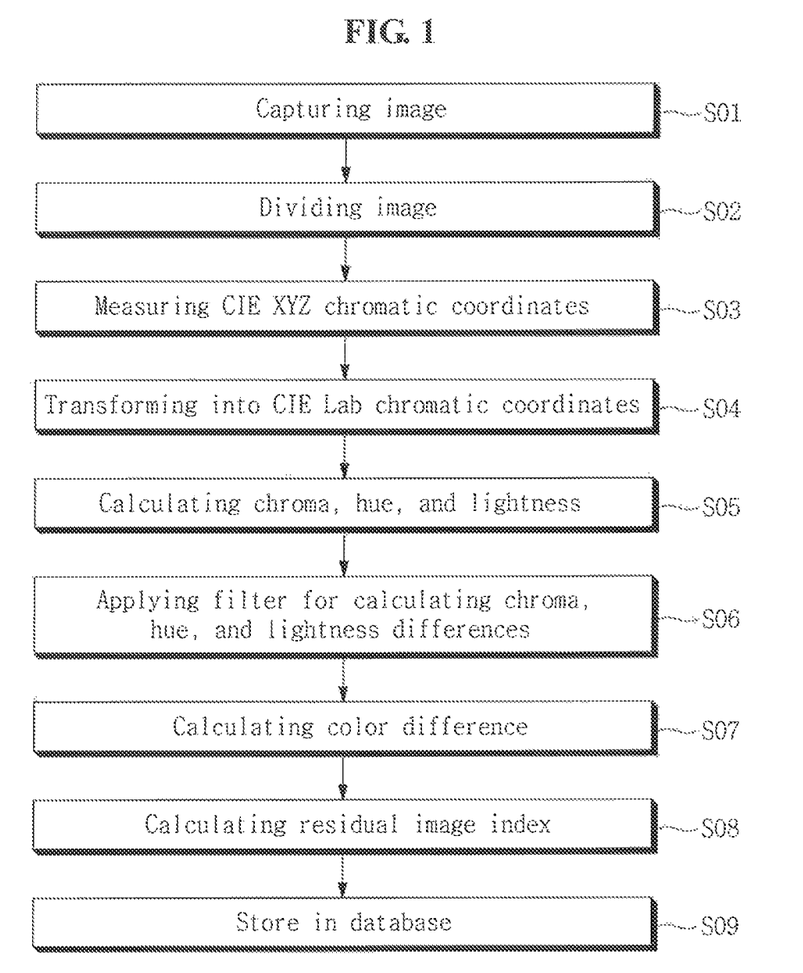
FIG. 1 is a flowchart of a method for determining residual images according to an exemplary embodiment.
Figure 2A:
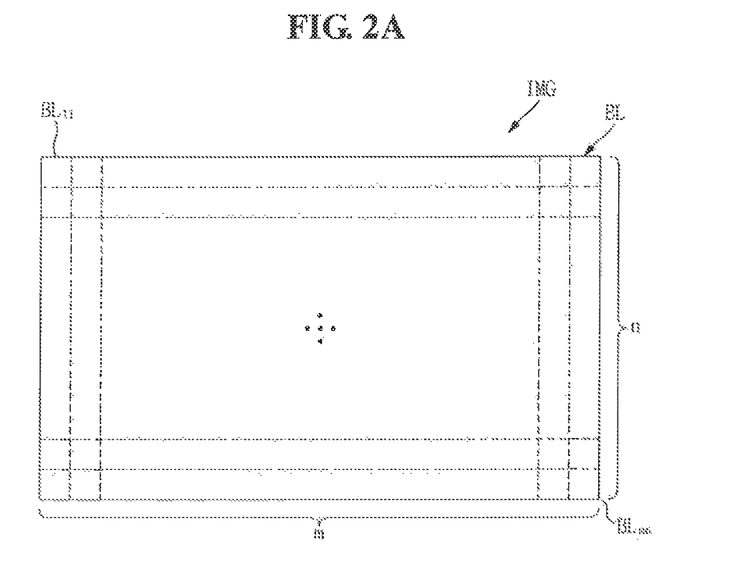
FIGS. 2A, 2B, 2C, 2D, and 2E illustrate a method for determining residual images according to an exemplary embodiment.
Figure 2B:
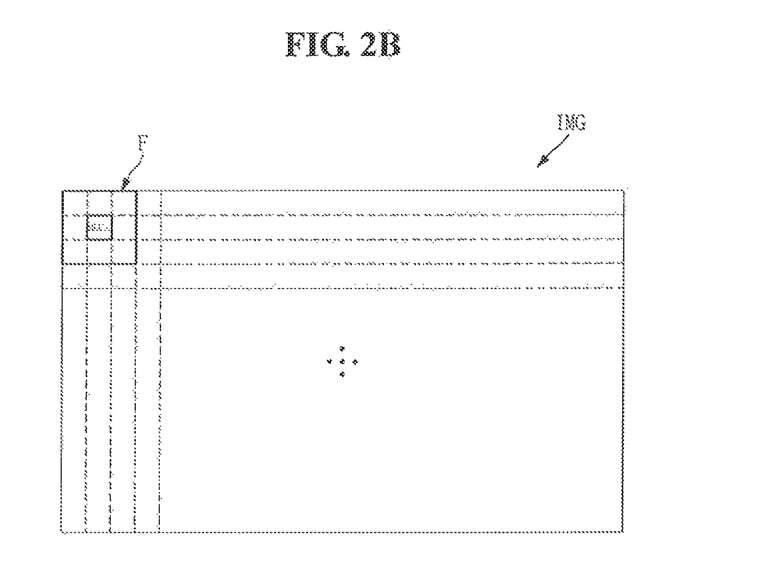
Figure 2C:
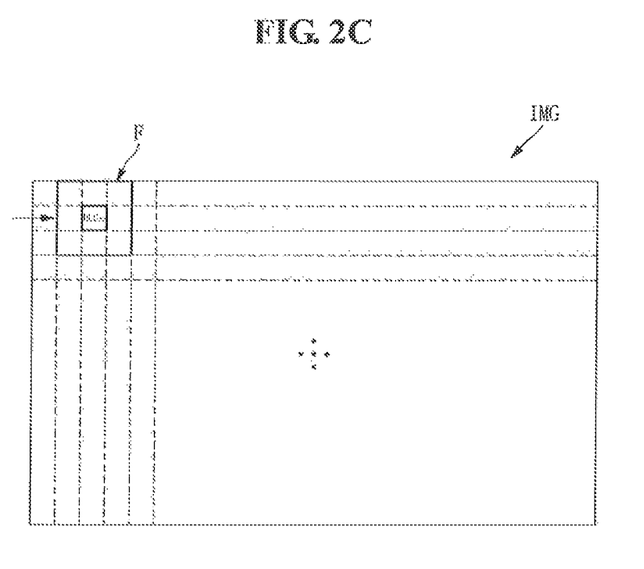
Figure 2D:
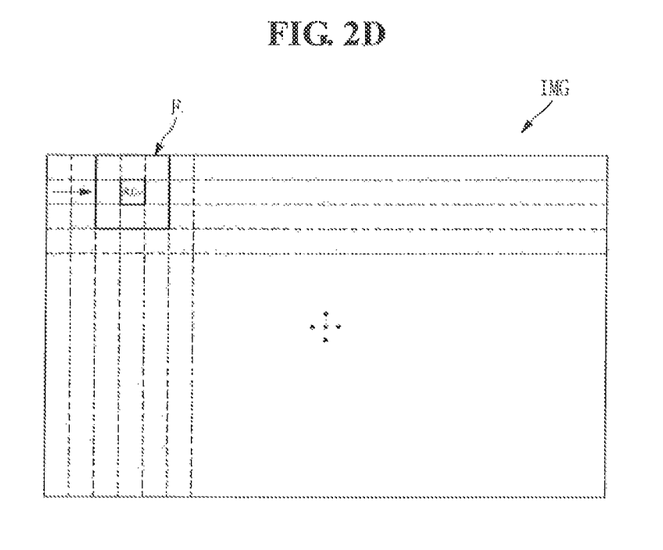
Figure 2E:
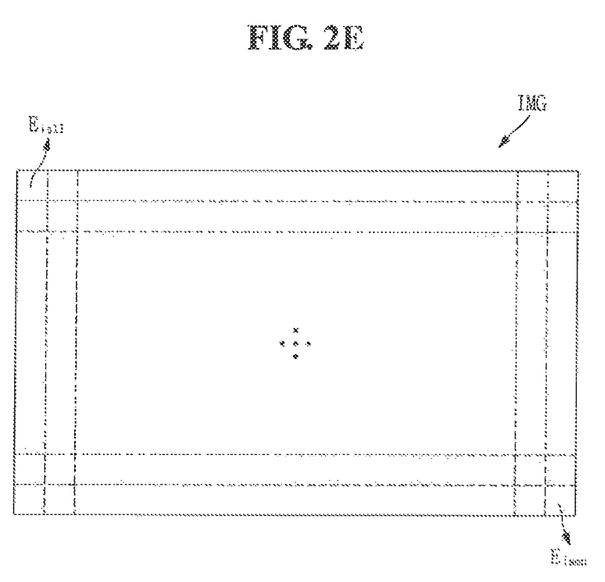
Figure 3:
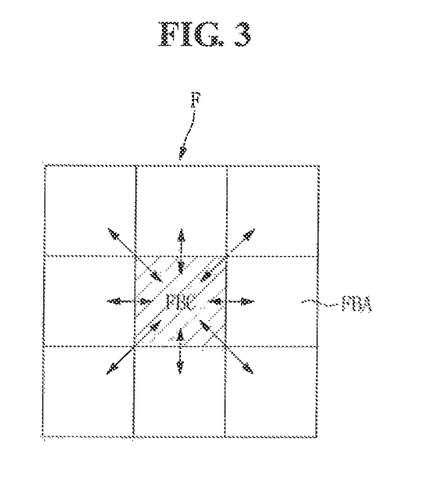
FIG. 3 illustrates a homogeneity operator filter according to an exemplary embodiment.

FIG. 1 is a flowchart of a method for determining residual images according to an exemplary embodiment, FIGS. 2A, 2B, 2C, 2D, and 2E illustrate a method for determining residual images according to an exemplary embodiment, and FIG. 3 illustrates a homogeneity operator filter according to an exemplary embodiment.

Hereinafter, a method for determining residual images of a display device will be described in detail with reference to FIGS. 1, 2A, 2B, 2C, 2D, and 2E.

A method for determining residual images according to an exemplary embodiment includes picking up an image (S01), dividing the image (S02), measuring CIE XYZ chromatic coordinates (S03), transforming the CIE XYZ chromatic coordinates into CIE Lab chromatic coordinates (S04), calculating a chroma, a hue, and a lightness (S05), filter-calculating a chroma difference, a hue difference, and a lightness difference (S06), calculating a color difference (S07), calculating a residual image index (S08), and storing the residual image index in a data base (S09).

First, according to an embodiment, a front surface of a display device is photographed to detect an image IMG on which residual images are displayed (S01). The detected image IMG may include a residual image detection pattern displayed by a display device for measuring a residual image. For example, the residual image detection pattern may be a checkerboard pattern. At this stage, an image focusing process may be performed to accurately measure lightness and chroma of the image IMG in which the residual image is displayed.

Next, according to an embodiment, as illustrated in FIG. 2A, the detected image IMG is divided into a plurality of unit blocks BL (S02). For example, the detected image IMG can be divided into m×n square unit blocks $BL_{11}$ to BLmn, where each of m and n is a natural number. However, exemplary embodiments are not limited thereto this, and the detected image IMG may be divided into rectangular unit blocks $BL_{11}$ to BLmn.

Next, according to an embodiment, CIE XYZ chromatic coordinates $X_{11}$ to Xmn, $Y_{11}$ to Ymn, and $Z_{11}$ to Zmn are measured for each unit block BL (S03).

Next, according to an embodiment, the CIE XYZ chromatic coordinates $X_{11}$ to Xmn, $Y_{11}$ to Ymn, and $Z_{11}$ to Zmn measured for each unit block BL are transformed into CIE Lab chromatic coordinates L×11 to L×mn, a×11 to a×mn, and b×11 to b×mn (S04). In particular, the CIE XYZ chromatic coordinates $X_{11}$ to Xmn, $Y_{11}$ to Ymn, and $Z_{11}$ to Zmn may be transformed into the CIE Lab chromatic coordinates L×11 to L×mn, a×11 to a×mn, and b×11 to b×mn based on the following Equation 1.

$$L^* = 116 f(Y/Y_n) - 16$$
$$a^* = 500[f(X/X_n) - f(Y/Y_n)]$$
$$b^* = 200[f(Y/Y_n) - f(Z/Z_n)]$$

EQ. 1

-continued $$f(I) = \begin{cases} I^{1/3} & \text{for } I > 0.008856 \\ 7.787 \times I + 4/29 & \text{otherwise} \end{cases}.$$

In EQ. 1, each of Xn, Yn, and Zn is a value obtained by normalizing the CIE XYZ values with respect to a standard white.

Next, according to an embodiment, a chroma C', a hue h', and a lightness L' are calculated for each unit block BL (S05). In particular, the chroma C', the hue h', and the lightness L' are calculated from the CIE Lab chromatic coordinates L×11 to L×mn, a×11 to a×mn, and b×11 to b×mn for each unit block BL based on Equation 2.

$$L'=L*$$

$$a'=(1+G)a*$$

$$b'=b*$$

$$C'=\sqrt{a'^2+b'^2}$$

$$h'=\tan^{-1}(b'/a').$$  EQ. 2:

In EQ. 2, each of a', b', and G is a transform variable.

Next, according to an embodiment, a filter F for calculating a chroma difference ΔC', a hue difference ΔH', and a lightness difference ΔL' is applied to each unit block BL (S06).

According to an embodiment, the filter F for calculating the chroma difference ΔC', the hue difference ΔH', and the lightness difference ΔL' is a homogeneity operator filter. However, exemplary embodiments are not limited thereto, and the filter F for calculating the chroma difference ΔC', the hue difference ΔH', and the lightness difference ΔL' can be a difference operator filter.

Referring to FIG. 3, according to an embodiment, the filter F includes a plurality of filter unit blocks, and the filter unit blocks of the filter F have a substantially identical shape and a substantially equal size as those of the plurality of unit blocks BL of the photographed image IMG.

According to an embodiment, the plurality of filter unit blocks include a filter center unit block FBC and eight filter adjacent unit blocks FBA that surround and are adjacent to the filter center unit block FBC. That is, the filter F is in the form of a matrix of 3 filter unit blocks×3 filter unit blocks.

According to an embodiment, the filter F moves horizontally or vertically on the captured image IMG to be applied to the entirety of the unit blocks BL of the captured image IMG. In particular, the filter F moves horizontally or vertically so that a center unit block BLC of the filter F is sequentially applied to all of the unit blocks BL of the captured image IMG. For example, as illustrated in FIGS. 2B, 2C, and 2D, the center unit block BLC of the filter F moves from a unit block $BLC_{22}$ located in row 2 and column 2, to a unit block $BLC_{23}$ located in row 2 and column 3, and to a unit block $BLC_{24}$ located in row 2 and column 4.

As illustrated in FIG. 3, according to an embodiment, the filter F calculates a chroma difference ΔC', a hue difference ΔH', and a lightness difference ΔL' between a unit block BL that corresponds to a center unit block BLC and a unit block BL that corresponds to an adjacent unit block BLA based on a chroma C', a hue h', and a lightness L' of a unit block BL that corresponds to the filter center unit block FBC and a unit block BL that corresponds to the filter adjacent unit block FBA, respectively.

For example, according to an embodiment, the filter F calculates a chroma difference ΔC', a hue difference ΔH', and a lightness difference ΔL' between the unit block BL that corresponds to the center unit block BLC and the unit block BL that corresponds to the adjacent unit block BLA, respectively, based on the CIEDE2000 standard as expressed by the following Equation 3.

$$\Delta h' = h'_b - h'_c$$  EQ. 3

$$\Delta L' = L'_b - L'_c$$

$$\Delta C' = C'_b - C'_b$$

$$\Delta H = 2\sqrt{C'_b C'_c} \sin\left(\frac{\Delta h'}{2}\right),$$

In EQ. 3, hc', Lc' and Cc' are a hue, a lightness, and a chroma, respectively, of a unit block BL that corresponds to the center unit block BLC, and $h_b'$, $L_b'$, and $C_b$ are a hue, a lightness, and a chroma, respectively, of a unit block BL that corresponds to the adjacent unit block BLA.

Next, according to an embodiment, eight color differences $\Delta E_{00}$ are calculated based on eight chroma differences ΔC', eight hue differences ΔH', and eight lightness differences ΔL' calculated for each unit block BL (S07). In particular, eight color differences $\Delta E_{00}$ are calculated based on calculated eight chroma differences ΔC', eight hue differences ΔH', and eight lightness differences ΔL', respectively, based on the CIEDE2000 standard as expressed by the following Equation 4.

$$\Delta E_{00} = \sqrt{\left(\frac{\Delta L'}{K_L S_L}\right)^2 + \left(\frac{\Delta C'}{K_C S_C}\right)^2 + \left(\frac{\Delta H'}{K_H S_H}\right)^2 + R_T\left(\frac{\Delta C'}{K_C S_C}\right)\left(\frac{\Delta H'}{K_H S_H}\right)}$$  EQ. 4

In EQ. 4, $S_L$ denotes a lightness compensation constant, $S_C$ denotes a chroma compensation constant, $S_H$ denotes a hue compensation constant, $K_L$ denotes a lightness weight constant, $K_C$ denotes a chroma weight constant, $K_H$ denotes a hue weight constant, and $R_T$ denotes a chroma rotation variable. The lightness compensation constant $S_L$, the hue compensation constant $S_H$, the chroma compensation constant Sc, and the chroma rotation parameter $R_T$ are variables that vary depending on the chroma C', the hue h', and the lightness L' of a unit block BL that corresponds to the filter center unit block FBC and the chroma C', the hue h', and the lightness L' of a unit block BL that corresponds to the filter adjacent unit block FBA.

According to an exemplary embodiment, the lightness weight constant $K_L$ has a value less than a value of the chroma weight constant $K_C$ and a value of the hue weight constant $K_H$. In particular, the lightness weight constant $K_L$ has a value of about 0.5 or less, and each of the chroma weight constant $K_C$ and the hue weight constant $K_H$ has a value of about 1. Accordingly, a color difference $\Delta E_{00}$ closer to the human recognition characteristics can be calculated, which will be described in detail below with reference to FIGS. 5A and 5B.

Next, according to an embodiment, as illustrated in FIG. 2E, residual image indices $E_{is11}$ to $E_{ismn}$, which are maximum values of the eight color differences $\Delta E_{00}$ calculated for each unit block BL, are calculated (S08). However, unit blocks BL located at an edge portion of the captured image IMG include three or five adjacent unit blocks BL, and for those unit blocks BL at an edge portion of the captured image IMG, residual image indices $E_{is11}$ to $E_{ismn}$ of the maximum values of the three or five calculated color differences ΔE00 are calculated. According to an exemplary embodiment, since a person recognizes a strongest stimulus, the maximum value of the eight color differences $\Delta E_{00}$ is defined as the residual image indices $E_{is11}$ to $E_{ismn}$ of respective unit blocks BL.

Finally, according to an embodiment, the residual image indices $E_{is}$ of the unit blocks BL of the captured image IMG are stored in a database (S09). In particular, the residual image indices $E_{is11}$ to $E_{ismn}$ of all of the unit blocks BL of the captured image IMG are stored in the database. Alternatively, an average value of or a value of the upper 10% of the residual image indices $E_{is11}$ to $E_{ismn}$ of the unit blocks BL can be calculated and stored in the database.

According to an exemplary embodiment, residual image indices relatively close to the human recognition characteristics can be defined and determined, and stored in a database to analyze and improve residual images. In addition, an irregular residual image which might not be measured by a conventional method can be managed with a standardized value.

Figure 4:
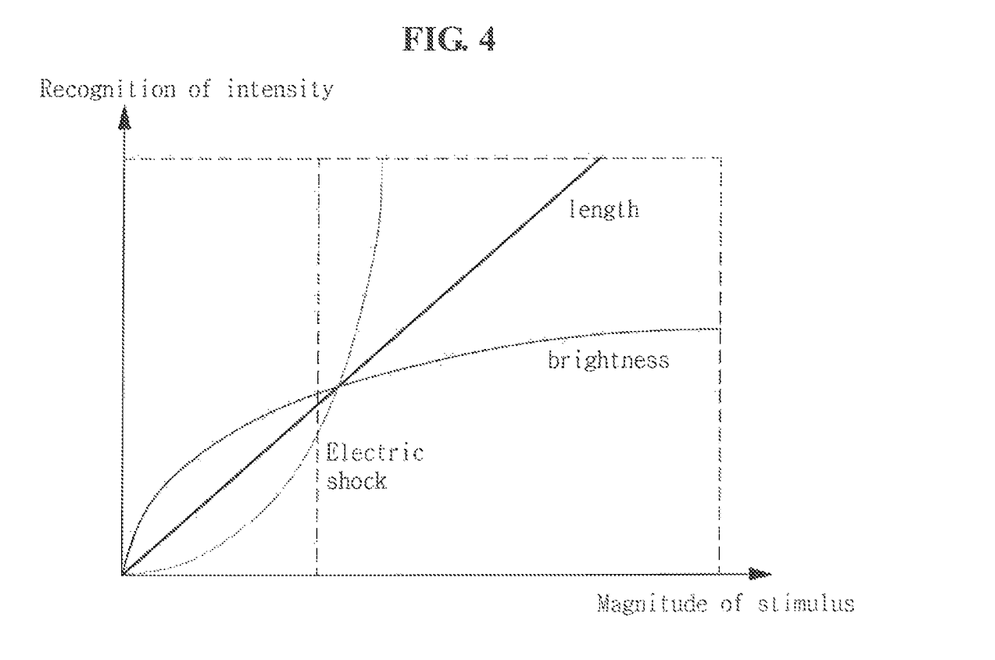
FIG. 4 is a graph of the recognition of an intensity as a function of a magnitude of a stimulus according to an exemplary embodiment.

FIG. 4 is a graph of the recognition of an intensity as a function of a magnitude of a stimulus according to an exemplary embodiment.

Hereinafter, optimization of a filter size according to an exemplary embodiment will be described in detail with reference to FIG. 4.

Referring to FIG. 4, according to an embodiment, recognition of an intensity with respect to a magnitude of a stimulus can be expressed by a proportional expression in a logarithmic scale (Fechner's Law). That is, there exists a saturation point from which recognition of the intensity does not greatly increase even when the magnitude of the stimulus increases.

According to an embodiment, the magnitude of the stimulus corresponds to the size of the filter F. When the size of the filter F is less than the magnitude of the stimulus at the saturation point, noise increases, and when the size of the filter F is greater than the magnitude of the stimulus at the saturation point, a stimulus less than a certain magnitude might not be recognized. Accordingly, the size of the filter F can be optimized based on the magnitude of the stimulus at the saturation point.

Figure 5A:
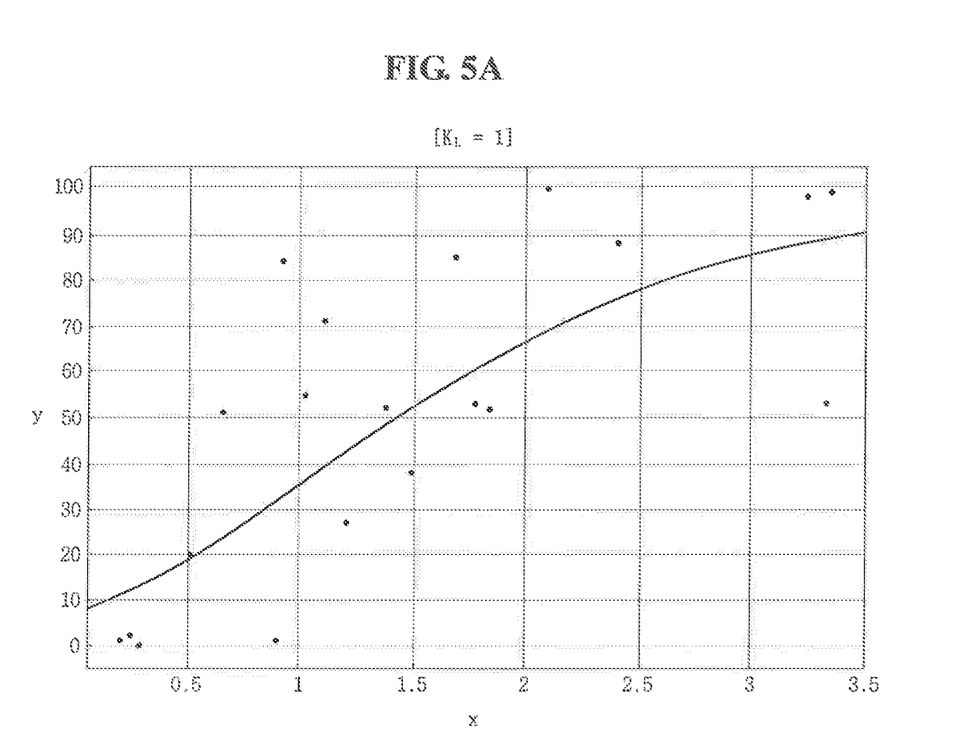
FIGS. 5A and 5B are graphs that illustrate values of residual image indices and just noticeable differences as a function of a $K_L$ value in CIEDE2000.
Figure 5B:
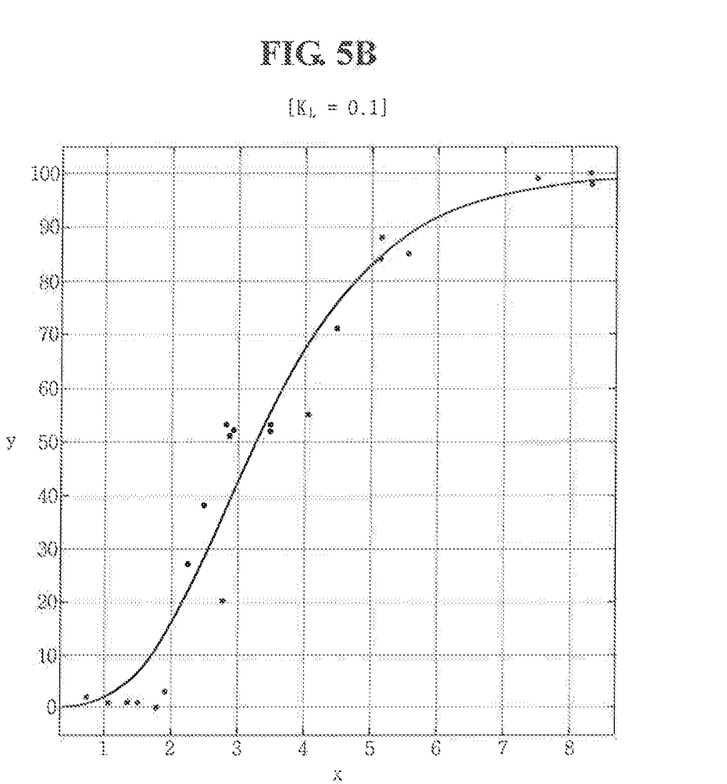
Figure 6:
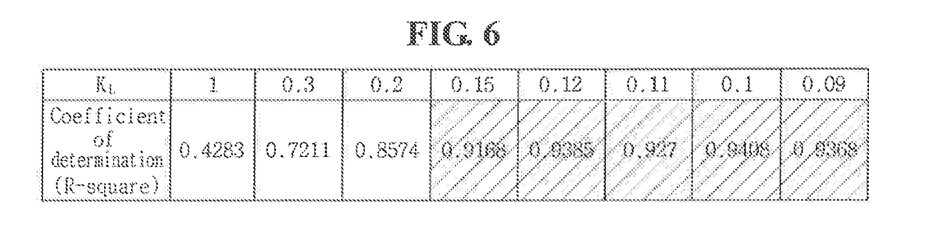
FIG. 6 is a table that shows a determination coefficient of generalized just noticeable difference and color difference as a function of the value of $K_L$.
Figure 7:
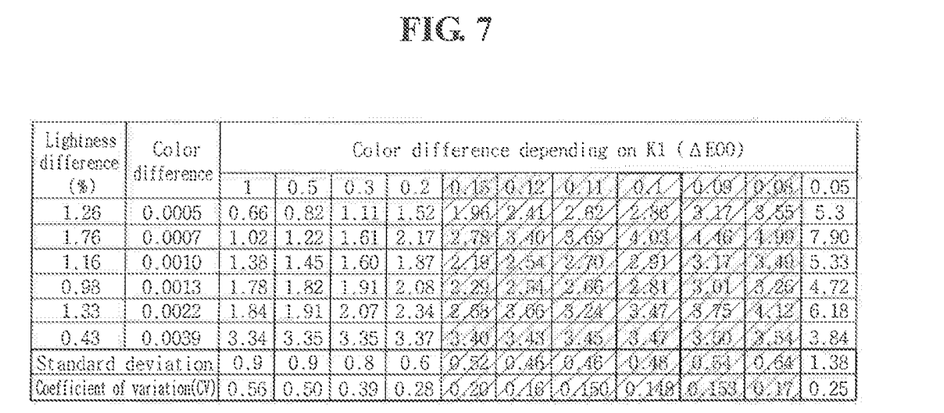
FIG. 7 is a table that shows a variation coefficient as a function of the value of $K_L$ with respect to a lightness difference and a color difference having a just noticeable difference identified through a recognition experiment.

FIGS. 5A and 5B are graphs that illustrate values of residual image indices and just noticeable differences as a function of a $K_L$ value in the CIEDE2000 color difference standard, FIG. 6 is a table that shows a determination coefficient of generalized just noticeable difference and color difference as a function of the $K_L$ value, and FIG. 7 is a table that shows a variation coefficient as a function of the $K_L$ value with respect to a lightness difference and a color difference having a just noticeable difference identified through a recognition experiment.

Referring to FIGS. 5A and 5B, according to an embodiment, when $K_1$, is 0.1, as compared to the graph when $K_L$ is 1, it may be appreciated that the residual image index $E_{is}$, which is a maximum value of each unit block color difference $\Delta E_{00}$, is closer to a graph of generalized just noticeable difference (JND).

According to an embodiment, JND refers to a difference in physical stimuli which causes a minimum sensory difference. That is, JND means a minimum difference in lightness, hue and chroma for which a person recognizes a residual image.

Referring to FIG. 6, according to an embodiment, a similarity between the generalized JND and the color difference $\Delta E_{00}$ as a function of $K_L$ can be identified.

According to an embodiment, a coefficient of determination (R-square) is a measure of a degree at which an estimated linear model is appropriate for a given data. The higher is a correlation between the estimated linear model and the given data, the closer is the coefficient of determination value to 1.

According to an embodiment, it may be appreciated that the coefficient of determination has a value of about 0.9 or more when the value of $K_L$ is in a range from about 0.09 to about 0.15. That is, it may be appreciated that the residual indices $E_{is}$ have values relatively close to the generalized JND when the value of $K_1$ is in a range from about 0.09 to about 0.15.

In particular, according to an embodiment, it may be appreciated that the coefficient of determination has a greatest value when the value of $K_L$ is about 0.1. That is, it may be appreciated that the residual indices $E_{is}$ have values closest to the generalized JND when the value of $K_L$ is about 0.1.

Referring to FIG. 7, according to an embodiment, a deviation of the residual image index $E_{is}$ as a function of the value of $K_L$ with respect to the lightness difference and the color difference having the JND can be identified.

A coefficient of variation CV is a standard deviation divided by an arithmetic mean, which is used to compare the distribution of data with different units of measurement. The larger is a value of the coefficient of variation CV, the greater is a relative difference in data.

It may be appreciated that the coefficient of variation CV has a small value of about 0.20 or less when the value of $K_L$ ranges from about 0.08 to about 0.15 with respect to the lightness difference and the color difference having the JND. That is, when the value of $K_L$ is in a range from about 0.08 to about 0.15, the fluctuation of the value of the calculated residual image index Eis is relatively small.

In particular, it may be appreciated that the coefficient of variation CV has a smallest value when the value of $K_L$ is about 0.1 with respect to the lightness difference and the color difference having the JND. That is, when the value of $K_L$ is about 0.1, the fluctuations of the value of the calculated residual image index Eis are minimized. Accordingly, the residual image index Eis according to an exemplary embodiment has a relatively uniform value with respect to a chroma having a JND, and a color difference closest to the human recognition characteristics may be achieved.

Figure 8:
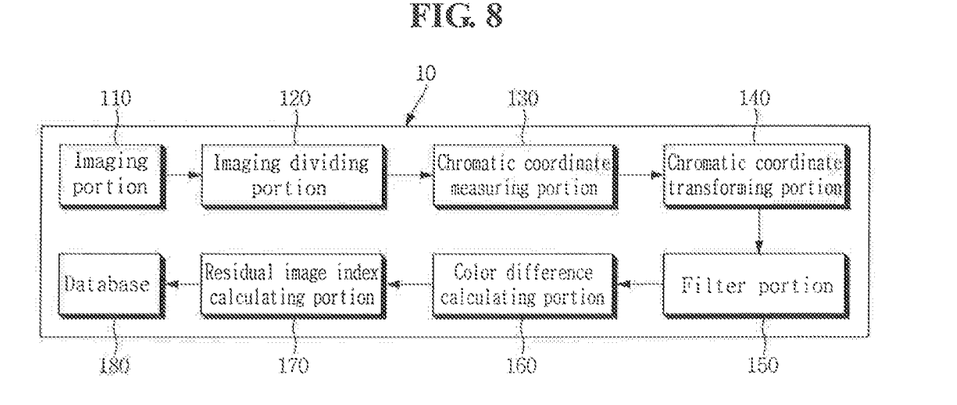
FIG. 8 is a schematic view of a device for determining residual images of a display device according to another exemplary embodiment.

FIG. 8 is a schematic view of a device for determining residual images of a display device according to another exemplary embodiment.

Hereinafter, a device for determining residual images of a display device according to another exemplary embodiment will be described in detail with reference to FIG. 8.

A residual image determining device 10 according to a present exemplary embodiment includes an imaging portion 110, an image dividing portion 120, a chromatic coordinate measuring portion 130, a chromatic coordinate transforming portion 140, a filter portion 150, a color difference calculating portion 160, a residual image index calculating portion 170, and a database 180.

According to an embodiment, the imaging portion 110 photographs a front surface of a display device to detect an image IMG in which a residual image appears. The detected image IMG may include a residual image detection pattern displayed on the display device that can measure a residual image. For example, the residual image detection pattern may be a checkerboard pattern.

According to an embodiment, the imaging portion 110 further includes a focusing element such as an iris for image focusing so as to accurately measure lightness and chroma of the image IMG in which the residual image appears.

According to an embodiment, the image dividing portion 120 divides the detected image IMG into a plurality of unit blocks BL. For example, the image dividing portion 120 can divide the detected image IMG into m×n square unit blocks $BL_{11}$ to BLmn, where each of m and n is a natural number. However, exemplary embodiments are not limited thereto this, and the image dividing portion 120 may divide the detected image IMG into rectangular unit blocks BL11 to BLmn.

According to an embodiment, the chromatic coordinate that measuring portion 130 measures CIE XYZ chromatic coordinates $X_{11}$ to Xmn, $Y_{11}$ to Ymn, and $Z_{11}$ to Zmn for each unit block BL. To this end, the chromatic coordinate measuring portion 130 includes a chromatic coordinate measuring apparatus that includes a color filter or an optical sensor, etc.

According to an embodiment, the chromatic coordinate transforming portion 140 transforms the CIE XYZ chromatic coordinates $X_{11}$ to Xmn, $Y_{11}$ to Ymn, and $Z_{11}$ to Zmn measured for each unit block BL into CIE Lab chromatic coordinates L×11 to L×mn, a×11 to a×mn, and b×11 to b×mn. For example, the chromatic coordinate transforming portion 140 transforms the CIE XYZ chromatic coordinates $X_{11}$ to Xmn, $Y_{11}$ to Ymn, and $Z_{11}$ to Zmn into CIE LAB chromatic coordinates L×11 to L×mn, a×11 to a×mn, and b×11 to b×mn based on the following Equation 1.

$$L^* = 116f(Y/Y_n) - 16 \quad \text{EQ. 1}$$
$$a^* = 500[f(X/X_n) - f(Y/Y_n)]$$
$$b^* = 200[f(Y/Y_n) - f(Z/Z_n)]$$
$$f(I) = \begin{cases} I^{1/3} & \text{for } I > 0.008856 \\ 7.787 \times I + 4/29 & \text{otherwise} \end{cases}.$$

In EQ. 1, each of Xn, Yn, and Zn is a value obtained by normalizing CIE XYZ with respect to standard white.

In addition, according to an embodiment, the chromatic coordinate transforming portion 140 calculates a chroma C', a hue h', and a lightness L' for each unit block BL. In particular, the chroma C', the hue h', and the lightness L' are calculated from the CIE Lab chromatic coordinates L×11 to L×mn, a×11 to a×mn, and b×11 to b×mn for each unit block BL based on the following Equation 2.

$$L'=L^*$$
$$a'=(1+G)a^*$$
$$b'=b^*$$
$$C'=\sqrt{a'^2+b'^2}$$
$$h'=\tan^{-1}(b'/a') \quad \text{EQ. 2}$$

In EQ 2, each of a', b', and G is a transform variable.

According to an embodiment, the filter portion 150 calculates a chroma difference ΔC', a hue difference ΔH', and a lightness difference ΔL' for each unit block BL.

According to an embodiment, the filter portion 150 includes a filter F that calculates the chroma difference ΔC', the hue difference ΔH', and the lightness difference ΔL'. In such an exemplary embodiment, the filter F is a homogeneity operator filter. Alternatively, in other embodiments, the filter F can be a difference operator filter.

According to an embodiment, the filter F calculates a chroma difference ΔC', a hue difference ΔH', and a lightness difference ΔL' between a unit block BL that corresponds to each center unit block BLC and unit blocks BL that correspond to adjacent unit blocks BLA, based on the CIEDE2000 standard as expressed by the following Equation 3.

$$\Delta L' = L'_b - L'_s \quad \text{EQ. 3}$$
$$\Delta C' = C'_b - C'_s$$
$$\Delta H' = 2\sqrt{C'_b C'_s} \sin\left(\frac{\Delta h'}{2}\right)$$

According to an embodiment, the color difference calculating portion 160 calculates eight color differences $\Delta E_{00}$ based on eight chroma differences ΔC', eight hue differences ΔH', and eight lightness differences ΔL' calculated for each unit block BL. In particular, eight color differences $\Delta E_{00}$ are calculated based on calculated eight chroma differences ΔC', eight hue differences ΔH', and eight lightness differences ΔL', respectively, based on the CIEDE2000 standard as expressed by the following Equation 4.

$$\Delta E_{00} = \sqrt{\left(\frac{\Delta L'}{K_L S_L}\right)^2 + \left(\frac{\Delta C'}{K_C S_C}\right)^2 + \left(\frac{\Delta H'}{K_H S_H}\right)^2 + R_T\left(\frac{\Delta C'}{K_C S_C}\right)\left(\frac{\Delta H'}{K_H S_H}\right)} \quad \text{EQ. 4}$$

In Equation 4, $S_L$ denotes a lightness compensation constant, $S_C$ denotes a chroma compensation constant, $S_H$ denotes a hue compensation constant, $K_L$ denotes a lightness weight constant, $K_C$ denotes a chroma weight constant, $K_H$ denotes a hue weight constant, and $R_T$ denotes a chroma rotation variable. The lightness compensation constant $S_L$, the hue compensation constant $S_H$, the chroma compensation constant Sc, and the chroma rotation parameter $R_T$ are variables that can vary depending on the chroma C', the hue h', and the lightness L' of a unit block BL that corresponds to the filter center unit block FBC and the chroma C', the hue h', and the lightness L' of a unit block BL that corresponds to the filter adjacent unit block FBA.

According to another exemplary embodiment, the lightness weight constant $K_L$ has a value less than a value of the chroma weight constant $K_C$ and a value of the hue weight constant $K_H$. For example, the lightness weight constant $K_L$ can have a value of about 0.5 or less, and each of the chroma weight constant $K_C$ and the hue weight constant $K_H$ can have a value of about 1.

According to an embodiment, the residual image index calculating portion 170 calculates residual image indices $E_{is11}$ to $E_{ismn}$, which are maximum values of the eight color differences $\Delta E_{00}$ calculated for each unit block BL. According to another exemplary embodiment, since a person recognizes a strongest stimulus, the maximum value of the eight color differences $\Delta E_{00}$ is defined as the residual image indices $E_{is11}$ to $E_{ismn}$ of respective unit blocks BL.

According to an embodiment, the database 180 stores the residual image indices $E_{is}$ is of the unit block BL of the captured image IMG in a database. In particular, the database 180 stores the residual image indices $E_{is11}$ to $E_{ismn}$ of all the unit blocks BL of the captured image IMG. Alternatively, the database 180 stores an average value of or a value of an upper 10% of the residual image indices $E_{is11}$ to $E_{ismn}$ of the unit block BL.

According to another exemplary embodiment, residual image indices relatively close to the human recognition characteristics are defined and determined, and stored in a database to analyze and improve residual images. In addition, an irregular residual image which might not be measured by a conventional method can be managed with a standardized value.

As set forth hereinabove, according to one or more exemplary embodiments, a device for determining residual images of a display device and a method for determining residual images of a display device can analyze and improve residual images of a display device by measuring quantified residual image indices based on human recognition characteristics and stores them in a database. While residual image indices according to embodiments of present disclosure do not eliminate residual images by themselves, the residual image indices express the causes of the residual images.

While embodiments of the present disclosure has been illustrated and described with reference to the exemplary embodiments thereof, it will be apparent to those of ordinary skill in the art that various changes in form and detail may be made thereto without departing from the spirit and scope of the present disclosure.

What is claimed is:

1. A method for determining residual images of a display device, the method comprising:
   capturing an image displayed by a display device;
   dividing the image into a plurality of unit blocks;
   measuring CIE XYZ chromatic coordinates for each unit block;
   transforming the CIE XYZ chromatic coordinates of each unit block into CIE Lab chromatic coordinates;
   calculating a chroma, a hue, and a lightness of each unit block from the CIE Lab chromatic coordinates of each unit block;
   applying a filter to the plurality of unit blocks to calculate a chroma difference, a hue difference, and a lightness difference, wherein the filter includes a filter center unit block and a plurality of filter adjacent unit blocks adjacent to the filter center unit block;
   calculating a plurality of color differences based on the chroma difference, the hue difference, the lightness difference between the unit block and unit blocks adjacent to the unit block, a chroma weight constant, a hue weight constant, and a lightness weight constant;
   calculating residual image indices for each unit block, wherein a residual image index is a maximum value of the plurality of color differences between the unit block and unit blocks adjacent to the unit block; and
   storing the residual image indices in a database,
   wherein the lightness weight constant is less than the chroma weight constant and the hue weight constant.

2. The method of claim 1, wherein the lightness weight constant has a value of about 0.08 or more and about 0.15 or less, and each of the hue weight constant and the chroma weight constant has a value of about 1.

3. The method of claim 1, wherein transforming the CIE XYZ chromatic coordinates of each unit block into the CIE Lab chromatic coordinates is performed based on a following equation:

$$L^* = 116 f(Y/Y_n) - 16$$

$$a^* = 500[f(X/X_n) - f(Y/Y_n)]$$

$$b^* = 200[f(Y/Y_n) - f(Z/Z_n)]$$

$$f(I) = \begin{cases} I^{1/3} & \text{for } I > 0.008856 \\ 7.787 \times I + 4/29 & \text{otherwise} \end{cases},$$

wherein $L^*$, $a^*$, and $b^*$ denote the CIE Lab chromatic coordinates of a unit block, X, Y, and Z denote the CIE XYZ chromatic coordinates of the unit block, and each of Xn, Yn, and Zn denotes a value obtained by normalizing the CIE XYZ chromatic coordinates with respect to a standard white.

4. The method of claim 3, wherein calculating the chroma, the hue, and the lightness of each unit block from the CIE Lab chromatic coordinates of each unit block comprises calculating the chroma, the hue, and the lightness of each unit block based on a following equation:

$$L' = L^*$$

$$a' = (1+G)a^*$$

$$b' = b^*$$

$$C' = \sqrt{a'^2 + b'^2}$$

$$h' = \tan^{-1}(b'/a'),$$

wherein $L^*$, $a^*$, and $b^*$ denote the CIE Lab chromatic coordinates of the unit block, L' denotes a lightness, C' denotes a chroma, h' denotes a hue, and each of a', b', and G denotes a transform variable.

5. The method of claim 1, wherein applying the filter to the image to calculate a chroma difference, a hue difference and a lightness difference comprises calculating the chroma difference, the hue difference and the lightness difference based on a following equation:

$$\Delta h' = h'_b - h'_c$$

$$\Delta L' = L'_b - L'_c$$

$$\Delta C' = C'_b - C'_b$$

$$\Delta H = 2\sqrt{C'_b C'_c} \sin\left(\frac{\Delta h'}{2}\right),$$

wherein $\Delta C'$ denotes the chroma difference, $\Delta H'$ denotes the hue difference, $\Delta L'$ denotes the lightness difference, $L_b'$ denotes a lightness of a unit block adjacent to the filter center unit block, $L_c'$ denotes a lightness of the filter center unit block, $C_b'$ denotes a chroma of the unit block adjacent to the filter center unit block, and $C_c'$ denotes a lightness of the filter center unit block.

6. The method of claim 5, wherein calculating the plurality of color differences comprises: calculating the plurality of color differences based on a following equation:

$$\Delta E_{00} = \sqrt{\left(\frac{\Delta L'}{K_L S_L}\right)^2 + \left(\frac{\Delta C'}{K_C S_C}\right)^2 + \left(\frac{\Delta H'}{K_H S_H}\right)^2 + R_T\left(\frac{\Delta C'}{K_C S_C}\right)\left(\frac{\Delta H'}{K_H S_H}\right)},$$

wherein $\Delta L'$ denotes the lightness difference between a unit block and unit blocks adjacent to the unit block, ΔC' denotes the chroma difference between the unit block and unit blocks adjacent to the unit block, ΔH' denotes the hue difference between the unit block and unit blocks adjacent to the unit block, $S_L$ denotes a lightness compensation constant, $S_C$ denotes a chroma compensation constant, $S_H$ denotes a hue compensation constant, $K_L$ denotes the lightness weight constant, $K_C$ denotes the chroma weight constant, $K_H$ denotes the hue weight constant, and Rt denotes a chroma rotation variable.

7. The method of claim 1, wherein the filter is a homogeneity operator filter.

8. The method of claim 1, wherein the filter is a difference operator filter.

9. The method of claim 1, wherein storing the residual image indices in a database comprises:
calculating a value of an upper 10% of the residual image indices or calculating an average of the residual image indices; and
storing the upper 10% of the residual image indices or the average of the residual indices in the database.

10. The method of claim 1, wherein applying the filter comprises:
moving the filter in a horizontal direction or a vertical direction wherein the filter center unit block is applied to all unit blocks of the image in a horizontal direction or a vertical direction; and
calculating an absolute value of a chroma difference, a hue difference, and a lightness difference between a unit block corresponding to the filter center unit block and a unit block corresponding to the filter adjacent unit block.

11. The method of claim 2, wherein the lightness weight constant has a value of about 0.1, and each of the hue weight constant and the chroma weight constant has a value of about 1.

12. A device for determining residual images of a display device comprising:
an imaging portion that captures an image displayed by a display device;
an image dividing portion that divides the image into a plurality of unit blocks;
a chromatic coordinate measuring portion that measures CIE XYZ chromatic coordinates for each unit block;
a chromatic coordinate transforming portion that transforms the CIE XYZ chromatic coordinates into CIE Lab chromatic coordinates and transforms the CIE Lab chromatic coordinates into a chroma, a hue, and a lightness;
a filter portion that calculates a chroma difference, a hue difference, and a lightness difference using the filter, wherein the filter portion includes a filter center unit block and filter adjacent unit blocks adjacent to the filter center unit block;
a color difference calculating portion that calculates a plurality of color differences based on the chroma difference, the hue difference, and the lightness difference between the unit block and unit blocks adjacent to the unit block, using a chroma weight constant, a hue weight constant, and a lightness weight constant;
a residual index calculating portion that calculates residual image indices for each unit block, wherein a residual image index is a maximum value of the plurality of color differences between the unit block and unit blocks adjacent to the unit block; and
a database that stores the residual image indices, wherein the lightness weight constant has a value less than a value of the chroma weight constant and a value of the hue weight constant.

13. The device of claim 12, wherein the lightness weight constant has a value of about 0.08 or more and about 0.15 or less, and each of the hue weight constant and the chroma weight constant has a value of about 1.

14. The device of claim 12, wherein the color difference calculating portion calculates the color difference based on a following equation:

$$\Delta E_{00} = \sqrt{\left(\frac{\Delta L'}{K_L S_L}\right)^2 + \left(\frac{\Delta C'}{K_C S_C}\right)^2 + \left(\frac{\Delta H'}{K_H S_H}\right)^2 + R_T\left(\frac{\Delta C'}{K_C S_C}\right)\left(\frac{\Delta H'}{K_H S_H}\right)},$$

wherein ΔL' denotes a lightness difference between the unit block and unit blocks adjacent to the unit block, ΔC' denotes a chroma difference between the unit block and unit blocks adjacent to the unit block, ΔH' denotes a hue difference between the unit block and unit blocks adjacent to the unit block, $S_L$ denotes a lightness compensation constant, $S_C$ denotes a chroma compensation constant, $S_H$ denotes a hue compensation constant, $K_L$ denotes the lightness weight constant, $K_C$ denotes the chroma weight constant, $K_H$ denotes the hue weight constant, and Rt denotes a chroma rotation variable.

15. The device of claim 12, wherein the filter is a homogeneity operator filter.

16. The device of claim 13, wherein the lightness weight constant has a value of about 0.1, and each of the hue weight constant and the chroma weight constant has a value of about 1.

17. A method for determining residual images of a display device, the method comprising:
dividing a digital image into a plurality of unit blocks;
applying a filter to the plurality of unit blocks to calculate a chroma difference between a unit block and unit blocks adjacent to the unit block, a hue difference between a unit block and unit blocks adjacent to the unit block, and a lightness difference between a unit block and unit blocks adjacent to the unit block, wherein the filter includes a filter center unit block and a plurality of filter adjacent unit blocks adjacent to the filter center unit block;
calculating a plurality of color differences based on a following equation:

$$\Delta E_{00} = \sqrt{\left(\frac{\Delta L'}{K_L S_L}\right)^2 + \left(\frac{\Delta C'}{K_C S_C}\right)^2 + \left(\frac{\Delta H'}{K_H S_H}\right)^2 + R_T\left(\frac{\Delta C'}{K_C S_C}\right)\left(\frac{\Delta H'}{K_H S_H}\right)},$$

wherein ΔL' denotes the lightness difference, ΔC' denotes the chroma difference, ΔH' denotes the hue difference, $S_L$ denotes a lightness compensation constant, $S_C$ denotes a chroma compensation constant, $S_H$ denotes a hue compensation constant, $K_L$ denotes a lightness weight constant, $K_C$ denotes a chroma weight constant, $K_H$ denotes a hue weight constant, and Rt denotes a chroma rotation variable; and
calculating residual image indices for each unit block, wherein a residual image index is a maximum value of the plurality of color differences between the unit block and unit blocks adjacent to the unit block, wherein the lightness weight constant is less than the chroma weight constant and the hue weight constant.

18. The method of claim 17, wherein the digital image is captured from a display of a display device, wherein the method further comprises:
   measuring CIE XYZ chromatic coordinates for each unit block;
   transforming the CIE XYZ chromatic coordinates of each unit block into CIE Lab chromatic coordinates;
   calculating a chroma, a hue, and a lightness of each unit block from the CIE Lab chromatic coordinates of each unit block; and
   storing the residual image indices into a database.

19. The device of claim 17, wherein the filter is a homogeneity operator filter.

20. The device of claim 17, wherein the lightness weight constant has a value of about 0.1, and each of the hue weight constant and the chroma weight constant has a value of about 1.

* * * * *